Figure 1:
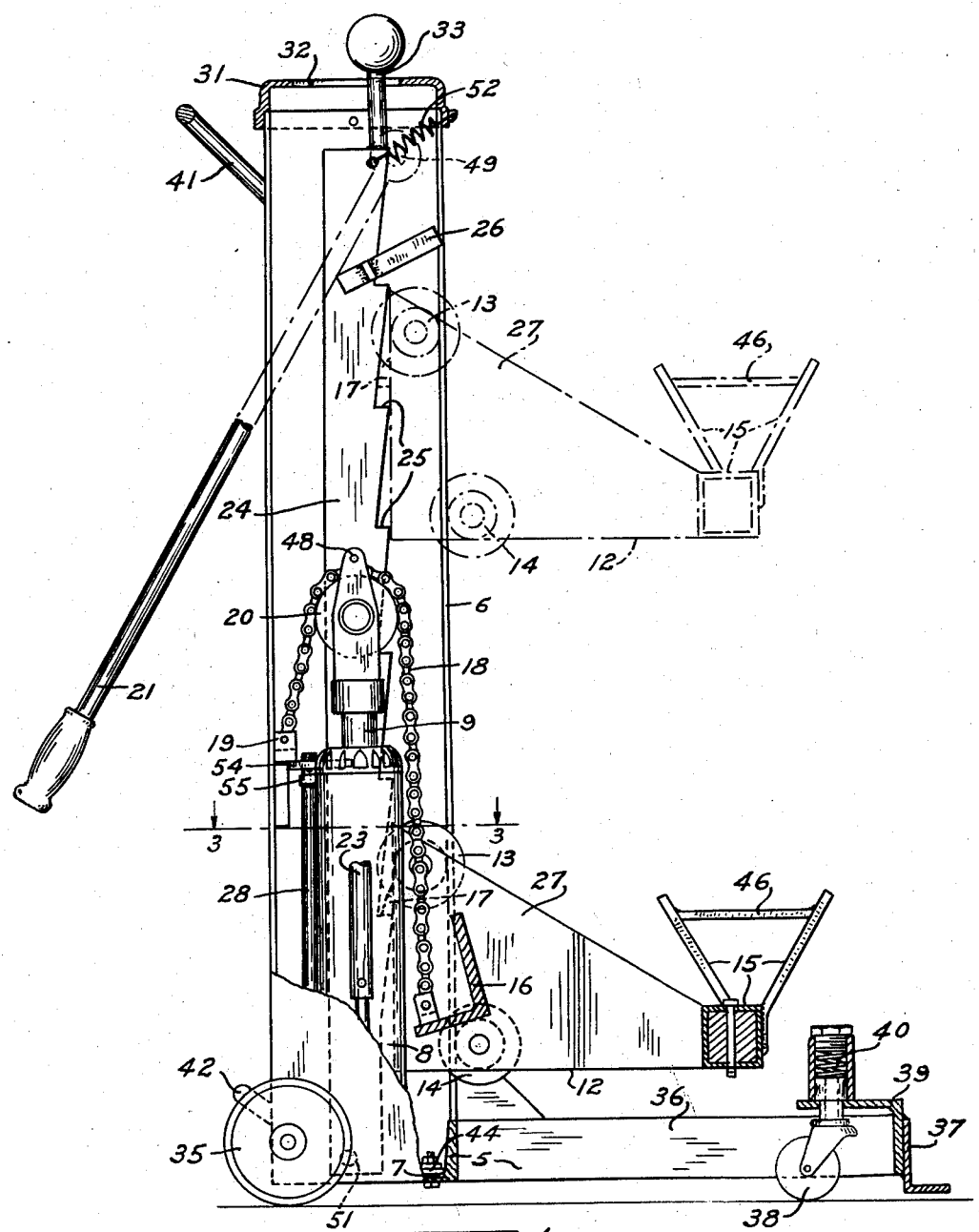

Oct. 20, 1959     H. I. SOUTHERWICK     2,909,358
PORTABLE JACK ASSEMBLAGE

Filed March 7, 1956                                     2 Sheets-Sheet 1

INVENTOR.
H. I. Southerwick
BY
Lieber & Lieber
ATTORNEYS.

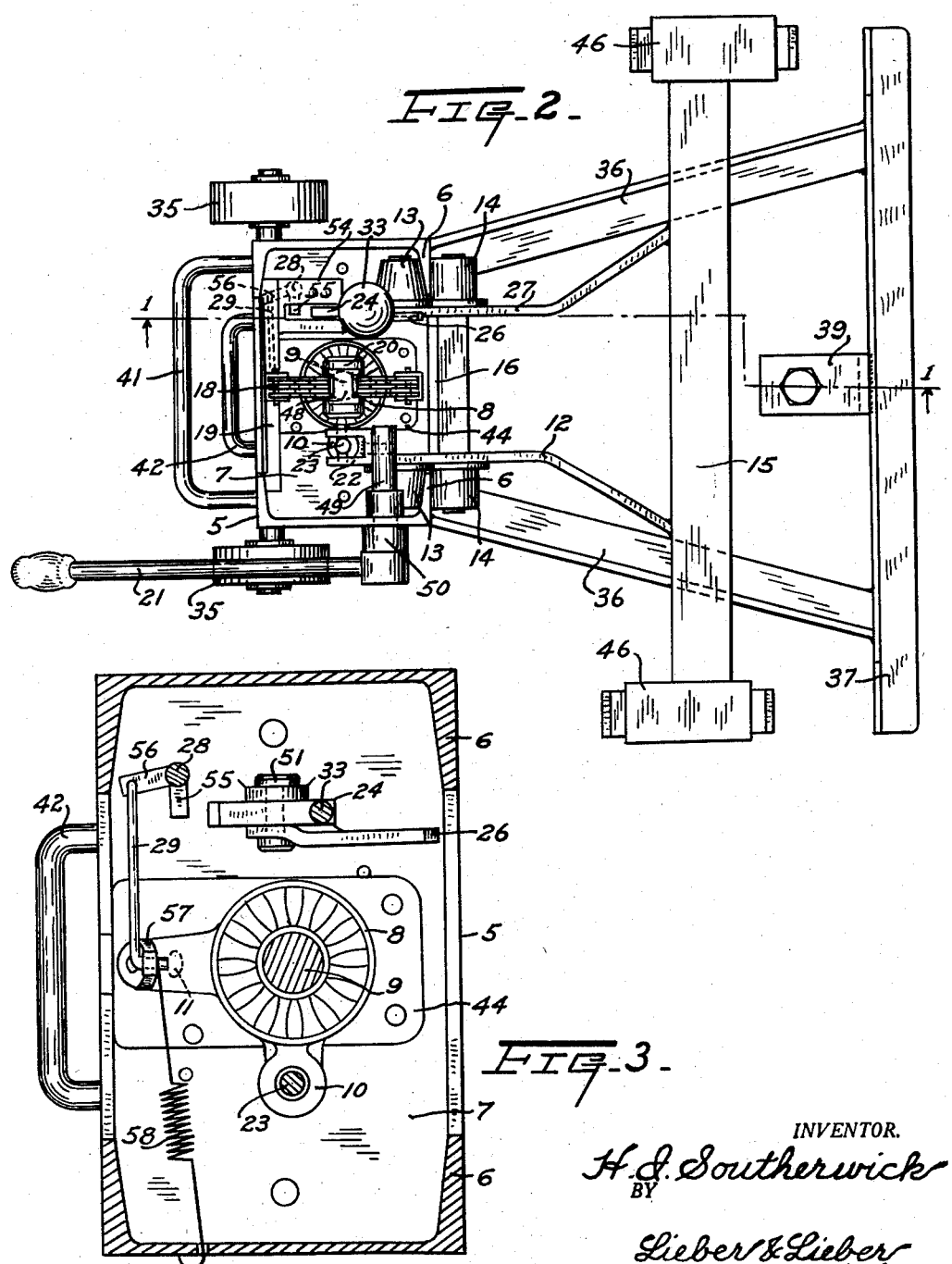

United States Patent Office 2,909,358
Patented Oct. 20, 1959

2,909,358

PORTABLE JACK ASSEMBLAGE

Harold I. Southerwick, Whitefish Bay, Wis., assignor to Blackhawk Mfg. Co., West Allis, Wis., a corporation of Wisconsin Application March 7, 1956, Serial No. 570,134

5 Claims. (Cl. 254—2)

This invention relates to improvements in automobile service jacks of the general type shown and described in my prior co-pending application Serial No. 456,094, filed September 15, 1954, now United States Patent No. 2,867,409, issued on January 6, 1959; and the primary object of the present invention is to provide additional safety features especially applicable to such jack assemblages.

In this prior application is shown a portable service jack for automobiles or the like, wherein a hydraulic lift is mounted upon a mobile chassis and cooperates with a load carrier slidable along guideways secured to the chassis to elevate the loads, and a control lever pivoted on the chassis functions to prevent accidental dropping of the carrier and its load but is also operable to effect lowering of the latter whenever so desired. The fluid pressure for raising the plunger of the lift is produced by a pump operable by means of an independent lever also pivoted on the chassis, and the control lever is provided with a series of teeth cooperable with a holding projection on the carrier to sustain the load in elevated condition in case of failure of the lifting pressure, but this control lever is also adapted to open the pressure release valve of the hydraulic pressure unit whenever it becomes desirable to lower the load by gravity.

While this prior service jack is highly successful and quite satisfactory in the performance of its intended functions, it does not make ample provision for preventing objectionable upward movement or overtravel of the plunger of the hydraulic lift, and it is therefore an important object of the present invention to provide means for positively limiting such overtravel and for causing the load carrier to stop whenever it reaches a predetermined height.

A clear conception of the features constituting the present improvement and of the construction and operation of a typical portable jack assemblage embodying the invention, may be had by referring to the drawings accompanying and forming a part of this specification wherein like reference characters designate the same or similar parts in the various views.

Fig. 1 is a part sectional side view of one of the improved portable jack assemblages, the section having been taken approximately along the irregular line 1—1 of Fig. 2, but the hydraulic power unit having been shown in elevation, and the load carrier also having been shown in lower and upper positions;

Fig. 2 is a top view of the same assemblage but with the upper cover removed in order to reveal internal structure; and Fig. 3 is an enlarged transverse horizontal section through the same jack assemblage, taken approximately along the line 3—3 of Fig. 1 but also showing the jack and some of the release valve actuating parts in elevation while the front portion of the chassis together with the load carrier and the transporting wheels have been omitted.

While the invention has been shown and described herein as having been embodied in a portable service jack especially adapted to cooperate with the bumpers of automobiles or the like, it is not intended to confine the use of the improvement to such jack assemblages; and it is also contemplated that specific descriptive terms employed in this specification be given the broadest possible interpretation.

As shown in the drawing, the improved mobile jack assemblage comprises in general, a portable chassis 5 having a pair of parallel upstanding rigid flanges or guideways 6 mounted upon the chassis base 7; a hydraulic lift having a cylinder 8 supported upon the base 7 and being provided with a power plunger 9 reciprocable between the guideways 6, and with a pump 10 for elevating and a release valve 11 for lowering the plunger 9; a load supporting elevator or carrier 12 guided for movement along the guideways 6 by upper inner and lower outer sets of rollers 13, 14 respectively, and being provided remote from these guideways 6 with a work engaging saddle 15 and adjacent to the guideways with a transverse beam 16 and a latch lug 17; a flexible motion transmitting element or chain 18 having one end attached to a fixed cross-bar 19 fastened to the chassis 5 while its opposite end is secured to the carrier beam 16 and its mid-portion coacts with a roller 20 journalled at the upper end of the plunger 9; an oscillatory hand lever 21 pivoted on the chassis 5 and being operatively connected to the pump 10 by a crank 22 and a connecting rod 23; and an independently manipulable control lever 24 also pivoted on the chassis 5 and having one side thereof provided with a series of load holding abutments or teeth 25 cooperable with the carrier lug 17, and with a limit stop 26 cooperable with a side wall 27 of the carrier 12, while its mid-portion is adapted to actuate the release valve 11 through a bell crank 28 and a connection 29.

The chassis 5 may be formed of sturdy channel bar stock and the upper extremities of the rigid guideways 6 may be provided with a removable cap 31 having therein a slot 32 guidingly coacting with the manipulating handle 33 of the control lever 24 as shown in Fig. 1. The base 7 of the chassis 5 is mounted on rear wheels 35 and has a pair of forwardly projecting sturdy angle iron beams 36 firmly attached thereto and the forward ends of which are rigidly interconnected by another angle iron bar 37 which provides a foot rest for the chassis 5 when in normal use. The medial portion of the bar 37 as a caster wheel 38 resiliently supported therefrom by means of a bracket 39 and a spring 40 which tends to lift the bar 37 upwardly when no load is applied to the jack assemblage, but is compressible to lower the foot rest into contact with the supporting floor or ground whenever the assemblage is loaded. The caster wheel 38 cooperates with the rear wheels 35 to provide a three point support for the portable chassis 5; and besides the cross-bar 19 and the cap 31, the upstanding guideways 6 are also firmly interconnected and reinforced by upper and lower transverse unit transporting handle bars 41, 42 respectively.

The hydraulic ram or lift which comprises the cylinder 8, plunger 9, pressure pump 10, and pressure release valve 11, is of relatively well known construction, and is mounted upon a base plate 44 which may be firmly attached to the chassis base 7 in any suitable manner with the path of reciprocation of the plunger 9 preferably disposed midway between the guideways 6, see Figs. 2 and 3. The ram cylinder 8 ordinarily houses a liquid reservoir from which the pump 10 is adapted to withdraw and deliver liquid under pressure beneath the plunger 9, and the release valve 11 is operable to release the liquid under pressure for escape and return into the supply reservoir so as to permit the plunger 9 to drop by gravity and under influence of a load applied thereto.

The load supporting elevator or carrier 12 may be constructed of heavy metal plate stock, and the opposite side walls of this carrier are movable in close proximity to the inwardly projecting parallel flanges 6 with which the rollers 13, 14 coact, see Fig. 2. The upper inner rollers 13 are tapered while the lower outer rollers 14 are cylindrical and all of these rollers 13, 14 are preferably provided with guiding flanges as illustrated. When the top cap 31 is removed from the guideways 6, and the lever 24 is swung rearwardly as far as possible, the load carrier 12 may be removed upwardly from between these guideways; and the cross beam 16 is preferably formed L-shaped and is firmly attached to the carrier side walls so as to reenforce the latter adjacent to the rollers 13, 14.

The transverse saddle 15 is also firmly attached to the forward ends of the carrier side walls so as to provide a rigid and strong load support, and the opposite ends of the saddle beam are provided with sockets 46 adapted to engage diverse loads such as the bumpers as automobiles.

The flexible motion transmitting element or chain 18 which connects the cross-bar 19 of the chassis 5 with the transverse L-beam 16 of the load carrier 12, rollably engages the roller 20 journalled in a bracket 48 secured to the upper end of the ram plunger 9 and this bracket 48 also functions to maintain the chain 18 in proper position upon the roller 20. This chain 18 may be of standard construction but must be of sufficient strength to amply carry the maximum load. The oscillatory pump actuating hand lever 21 is secured to a pivot shaft 49 which is journalled in a bearing 50 carried by one of the guideways 6, and the crank 22 which is pivotally attached to the pump actuating rod 23, is also firmly secured to the pivot shaft 49, see Fig. 2. The independently operable release valve control lever 24 is swingably suspended by a pivot pin 51 mounted in ears on the chassis base 7 as illustrated in Fig. 3, and this lever 24 is constantly urged toward the right as viewed in the drawings by means of a tension spring 52 so as to place the teeth 25 in the path of advancement of the holding lug 17 and the limit stop 26 in the path of the rising carrier side wall 27.

Besides being guided by the slot 32 in the cover 31, the lever 24 is also guided by a bifurcated fixed shelf 54 secured to the cross-bar 19 and in which the bell crank 28 is journalled, and the upper radial arm 55 of this bell crank 28 is cooperable with the medial portion of the control lever 24 while its lower radial arm 56 is attached to one end of the connection 29 the opposite end of which is attached to the actuating lever 57 of the release valve 11, as shown in Fig. 3. This lever 57 is constantly urged toward release valve closing position by means of a tension spring 58 so that the valve 11 is normally closed whenever the lever 24 is swung out of engagement with the bell crank arm 55.

When the various parts of the improved portable jack unit have been constructed and assembled as hereinabove described, they will during periods of inactivity be in the position shown in solid lines in Fig. 1, with the foot rest bar 37 raised from the floor or ground, the carrier 12 in lowermost position, and the lever 21 lowered while the lever 24 is in foremost position. The unit may then be freely transported from place to place with the aid of the handle bars 41, 42 while resting upon the three point support provided by the wheels 35, 38. If it becomes desirable to lift a load such as an automobile, the bars 41, 42 may also be utilized to position the saddle sockets 46 beneath the vehicle bumper whereupon the assemblage may be actuated as follows:

The hand lever 21 may be oscillated to reciprocate the pump rod 23 thus causing the pump 10 to withdraw liquid from the storage reservoir and to deliver this liquid under pressure beneath the plunger 9 thereby raising the roller 20 which then coacts with the medial portion of the flexible chain 18 to lift the carrier 12 and the load resting upon the saddle 15, and simultaneously lowering the foot rest beam 37 into contact with the ground. Since the control lever 24 is normally being urged forwardly by the upper spring 52 so as to close the release valve 11 and to position the holding teeth 25 within the path of upward movement of the carrier lug 17, this lug will intermittently swing the lever 24 rearwardly as it passes the successive teeth 25, but this swinging movement is not sufficient to open the release valve 11. When the load has been thus elevated to the desired extent the oscillation of the lever 21 should cease whereupon the liquid under pressure within the cylinder 8 beneath the plunger 9 will ordinarily maintain the carriage 12 and the load in elevated position.

However, if the oscillation of the lever 21 and the resultant actuation of the pump 10 is continued until the carriage 12 has risen sufficiently so that the carriage side wall 27 engages the safety stop 26 at the upper portion of the lever 24, then this lever 24 will automatically be swung rearwardly due to the inclination of the limit stop 26, to such an extent that the lever 24 will contact the arm 55 of the bell crank 28 and will cause the latter to open the release valve 11 thereby releasing the lifting fluid pressure and promptly stopping the upward travel of the carriage 12. The carriage 12 will thereafter descend slightly but sufficiently to cause the spring 52 to return the lever 24 to release valve closing position, but this automatic carrier stopping action will be repeated as long as the oscillation of the pump operating lever 21 continues.

When the load has been lifted within the normal limits of travel of the carriage 12 and the oscillation of the pump lever 21 has been discontinued, the load will normally be held in elevated position by the plunger 9, but if the liquid pressure acting upon this plunger 9 should fail, then the carriage will descend only a sufficient distance to cause the holding lug 17 to engage the nearest abutment tooth 25 of the control lever 24 located directly below this lug 17. The carriage 12 and its load will then be maintained in elevated position by the lever 24 and will not descend farther until this lever is swung away from the lug 17, and if this swinging motion of the control lever 24 is continued sufficiently to actuate the bell crank 28, then the release valve 11 will be opened and the carriage 12 with its load will descend at any desired speed dependent upon the manipulation of the lever 24 by the operator.

During the advancement of the carriage 12 in either direction, and while it is being held in any position, the rollers 13, 14 will coact with the guideways 6 to retain the carriage in perpendicular position relative to the guide flanges. The use of the roller 20 coacting with the chain 18 and the rollers 13, 14 coacting with the guideways 6 reduces the friction losses to a minimum, and the spring 40 which coacts with the caster wheel also permits the load to promptly lower the foot rest beam 37 into firm engagement with the floor or ground. The entire assemblage is obviously simple but durable and safely operable, and the limit stop 26 is of great importance in preventing undesirable overtravel of the carriage 12 during elevation thereof, while the use of the lug 17 coacting with the teeth 25 is also important in eliminating undesirable dropping of the load. The improved jack unit has proven highly satisfactory and successful in actual commercial use, and is especially adapted for application as a vehicle service jack.

It should be understood that it is not desired to limit this invention to the exact details of construction and operation of the portable jack assemblage herein specifically shown and described, for various modifications within the scope of the appended claims may occur to persons skilled in the art.

I claim:

1. A portable jack assemblage comprising, a transportable chassis having thereon upstanding parallel guide flanges, a load lifting unit mounted upon said chassis and having a lifting member movable upwardly between said flanges, a load carrier provided with a latch lug coacting with the rear and front surfaces of said flanges to guide the carrier along an upright path, a flexible element having one end secured to said chassis and its opposite end secured to said carrier while its medial portion is movably cooperable with the upper end of said lifting member to vary the elevation of the carrier relative to the chassis, an oscillatory hand lever for actuating said unit to move said load lifting member and said carrier upwardly, and a control lever mounted upon said chassis and being manipulable independently of said hand lever to actuate said unit to effect lowering said carrier, said control lever having thereon a series of abutments cooperable with said latch lug to positively maintain the load in various elevated positions and also having thereon a formation cooperable with said carrier to arrest the upward movement of the latter at a predetermined maximum elevation.

2. A portable jack assemblage comprising, a transportable chassis having thereon upstanding parallel guide flanges, a load lifting unit mounted upon said chassis and having a lifting member movable upwardly between said flanges, a load carrier coacting with and being movable between said flanges to guide the carrier along an upright path, an elongated element having one end secured to said chassis and its opposite end secured to said carrier while its medial portion is movably cooperable with the upper end of said lifting member to vary the elevation of the carrier relative to the chassis, an oscillatory hand lever for actuating said unit to move said load lifting member and said carrier upwardly, and a control lever swingably mounted upon said chassis and having a front formation cooperable directly with said carrier to positively and automatically stop the load in maximum elevated position, said control lever being manipulable independently of said hand lever to effect lowering of said carrier.

3. A portable jack assemblage comprising, a transportable chassis having thereon upstanding spaced guideways, an hydraulic lift mounted upon said chassis and having a load lifting plunger movable upwardly between said flanges and also having a pump for raising and a release valve for effecting lowering of the plunger, a load carrier provided with a latch lug and being guided for movement along said flanges, a flexible element having one end secured to said chassis and its opposite end secured to said carrier while its medial portion is movably cooperable with the upper end of said plunger to vary the elevation of the carrier relative to the chassis, a lever for actuating said pump to effect raising of said plunger and said carrier, and a control lever mounted upon said chassis and being manipulable independently of said pump actuating lever to actuate said release valve to effect lowering of said plunger and said carrier, said control lever being provided with spaced abutments engageable with said latch lug to maintain said carrier in various elevated positions and having thereon a formation cooperable directly with said carrier to automatically arrest the upward movement of the latter in maximum elevated position.

4. A portable jack assemblage comprising, a transportable chassis having thereon upstanding guideways, an hydraulic lift mounted upon said chassis and having a load lifting plunger movable upwardly between said flanges and also having a pump for raising and a release valve for effecting lowering of the plunger, a load carrier guided for movement along said flanges and having thereon a latch lug, a flexible element connecting said chassis and said carrier and being movably cooperable with the upper end of said plunger to vary the elevation of the carrier relative to the chassis, a lever for actuating said pump to effect raising of said plunger and said carrier, and a control lever mounted upon said chassis and being manipulable independently of said pump actuating lever to actuate said release valve to effect lowering of said plunger and said carrier, said control lever having thereon a series of teeth cooperable with said carrier lug to positively sustain the load in various elevated positions when the lifting force acting upon said plunger fails and also having a formation cooperable directly with said carrier to arrest the upward movement of the latter at a predetermined maximum elevation.

5. A portable jack assemblage comprising, a transportable chassis having thereon upstanding guideways, an hydraulic lift mounted upon said chassis and having an upwardly movable load lifting plunger and also having a pump for effecting raising and a release valve for effecting lowering of the plunger, a load carrier guided for movement along said flanges and having thereon a latch lug, a flexible element connecting said chassis with said carrier and being movably cooperable with the upper end of said plunger to vary the elevation of the carrier, a lever for actuating said pump to effect raising of said plunger and said carrier, and a control lever mounted upon said chassis being manipulable independently of said pump actuating lever to actuate said release valve to effect lowering of said plunger and said carrier, said control lever having thereon a series of teeth cooperable with said carrier lug to positively sustain the load in various elevated positions when the lifting force acting upon said plunger fails, and also having a formation for automatically positively limiting the upward movement of the carrier, and means for constantly resiliently urging said control lever toward said carrier.

References Cited in the file of this patent

UNITED STATES PATENTS

| | | |
|---|---|---|
| 2,059,059 | Thompson | Oct. 23, 1936 |
| 2,493,824 | Noros | Jan. 10, 1950 |
| 2,669,424 | Branick | Feb. 16, 1954 |
| 2,736,531 | Wilson | Feb. 28, 1956 |
| 2,763,465 | Tosi et al. | Sept. 18, 1956 |